US009747927B2

(12) United States Patent
Nakano et al.

(10) Patent No.: US 9,747,927 B2
(45) Date of Patent: Aug. 29, 2017

(54) SYSTEM AND METHOD FOR MULTIFACETED SINGING ANALYSIS

(71) Applicant: National Institute of Advanced Industrial Science and Technology, Tokyo (JP)

(72) Inventors: Tomoyasu Nakano, Ibaraki (JP); Kazuyoshi Yoshii, Ibaraki (JP); Masataka Goto, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 15/119,747

(22) PCT Filed: Aug. 15, 2014

(86) PCT No.: PCT/JP2014/071480
§ 371 (c)(1),
(2) Date: Aug. 18, 2016

(87) PCT Pub. No.: WO2015/125321
PCT Pub. Date: Aug. 27, 2015

(65) Prior Publication Data
US 2017/0061988 A1 Mar. 2, 2017

(30) Foreign Application Priority Data

Feb. 21, 2014 (JP) .................................. 2014-032032

(51) Int. Cl.
*G10L 21/00* (2013.01)
*G10L 25/54* (2013.01)
(Continued)

(52) U.S. Cl.
CPC ........ *G10L 25/54* (2013.01); *G06F 17/30758* (2013.01); *G10H 1/00* (2013.01);
(Continued)

(58) Field of Classification Search
CPC ....... G10L 25/54; G10L 13/02; G10L 19/022; G10L 21/01; G10L 21/14; G10L 25/12;
(Continued)

(56) References Cited

U.S. PATENT DOCUMENTS

| 2004/0088291 | A1 | 5/2004 | Matsuzaki et al. |
| 2008/0072740 | A1 | 3/2008 | Horii et al. |
| 2009/0132077 | A1 | 5/2009 | Fujihara et al. |

FOREIGN PATENT DOCUMENTS

| JP | 2002-014974 | 1/2002 |
| JP | 2004-152110 | 5/2004 |

(Continued)

OTHER PUBLICATIONS

Miyazawa, Y., Tsubaki, T. and Iida, Y.: "A Method of Measuring Music Similarity for Selection of Favorite Music" Information Processing Society of Japan, Proc of 68th National Convention(2), pp. 181-182 (2006), Listed in International Search Report.

(Continued)

*Primary Examiner* — Thierry L Pham
(74) *Attorney, Agent, or Firm* — Rankin, Hill & Clark LLP

(57) ABSTRACT

A system for multifaceted singing analysis for retrieval of songs or music including singing voices having some relationship in latent semantics with a singing voice included in one particular song or music. A topic analyzing processor uses a topic model to analyze a plurality of vocal symbolic time series obtained for a plurality of musical audio signals. The topic analyzing processor generates a vocal topic distribution for each of the musical audio signals whereby the (Continued)

vocal topic distribution is composed of a plurality of vocal topics each indicating a relationship of one of the musical audio signals with the other musical audio signals. The topic analyzing processor generates a vocal symbol distribution for each of the vocal topics whereby the vocal symbol distribution indicates occurrence probabilities for the vocal symbols. A multifaceted singing analyzing processor performs analysis of singing voices included in musical audio signals, in the multifaceted viewpoint.

22 Claims, 13 Drawing Sheets

(51) Int. Cl.
*G10L 13/02* (2013.01)
*G06F 17/30* (2006.01)
*G10H 1/00* (2006.01)
*G10L 19/022* (2013.01)
*G10L 21/01* (2013.01)
*G10L 21/14* (2013.01)
*G10L 25/12* (2013.01)
*G10L 25/00* (2013.01)

(52) U.S. Cl.
CPC ............ *G10L 13/02* (2013.01); *G10L 19/022* (2013.01); *G10L 21/01* (2013.01); *G10L 21/14* (2013.01); *G10L 25/12* (2013.01); *G10H 2210/056* (2013.01)

(58) Field of Classification Search
CPC ........ G06F 17/30758; G10H 2210/056; G10H 1/00
USPC ................................ 704/207, 208, 250, 270
See application file for complete search history.

(56) References Cited

FOREIGN PATENT DOCUMENTS

JP        2009-123124     6/2009
WO       2006/075432     7/2006

OTHER PUBLICATIONS

Fujihara, H. and Goto, M.: "Vocal Finder: A music information retrieval system based on vocal timbre similarity", Information Processing Society of Japan, Technical Report, vol. 2007 No. 81, pp. 27-32 (2007), Listed in International Search Report.
Brochu, E. and de Freitas, N.: "Name That Song!": A Probabilistic Approach to Querying on Music and Text: Proc. of NIPS2002(2002), Discussed in specification.
Ueda, Y., Tsunoo, E., Ono, N. and Sagayama, S,: "Music Genre Classification by Latent Semantic Analysis of Bass Line", Acoustical Society of Japan, Proc. of 2009 Spring Meeting, pp. 875-876 (2009), Discussed in specification.
Hu, D.J., and Saul, L. K: "A Probabilistic Topic Model for Unsupervised Learning of Musical Key-Profiles", Proc. of 10th International Society for Music Information Retrieval Conference, pp. 441-446 (2009), Discussed in specification.
Takahashi, R., Ohishi, Y., Kitaoka, N. and Takeda, K.: "Building and Combining Document and Music Spaces for Music Query-by-Webpage System", Proc. of Interspeech 2008, pp. 2020-2023 (2008), Discussed in specification.
Symeonidis, P., Ruxanda, M., Nanopoulos, A. and Manolopoulos, Y.: "Ternary Semantic Analysis of Social Tags for Personalized Music Recommendation", Proc. of ISMIR 2008, pp. 219-224 (2008).
Hoffmann, M., Blei, D. and Cook, P.: "Content-Based Musical Similarity Computation Using the Hierarchical Direchlet Process", Proc. of ISMR 2008, pp. 349-354 (2008), Discussed in specification.
Pampalk, E.: "Islands of Music—Analysis, Organization, and Visualization of Music Archives", Master's thesis, Vienna University of Technology (2001), Discussed in specification.
International Search Report, Date of mailing: Nov. 11, 2014 (Nov. 11, 2014).

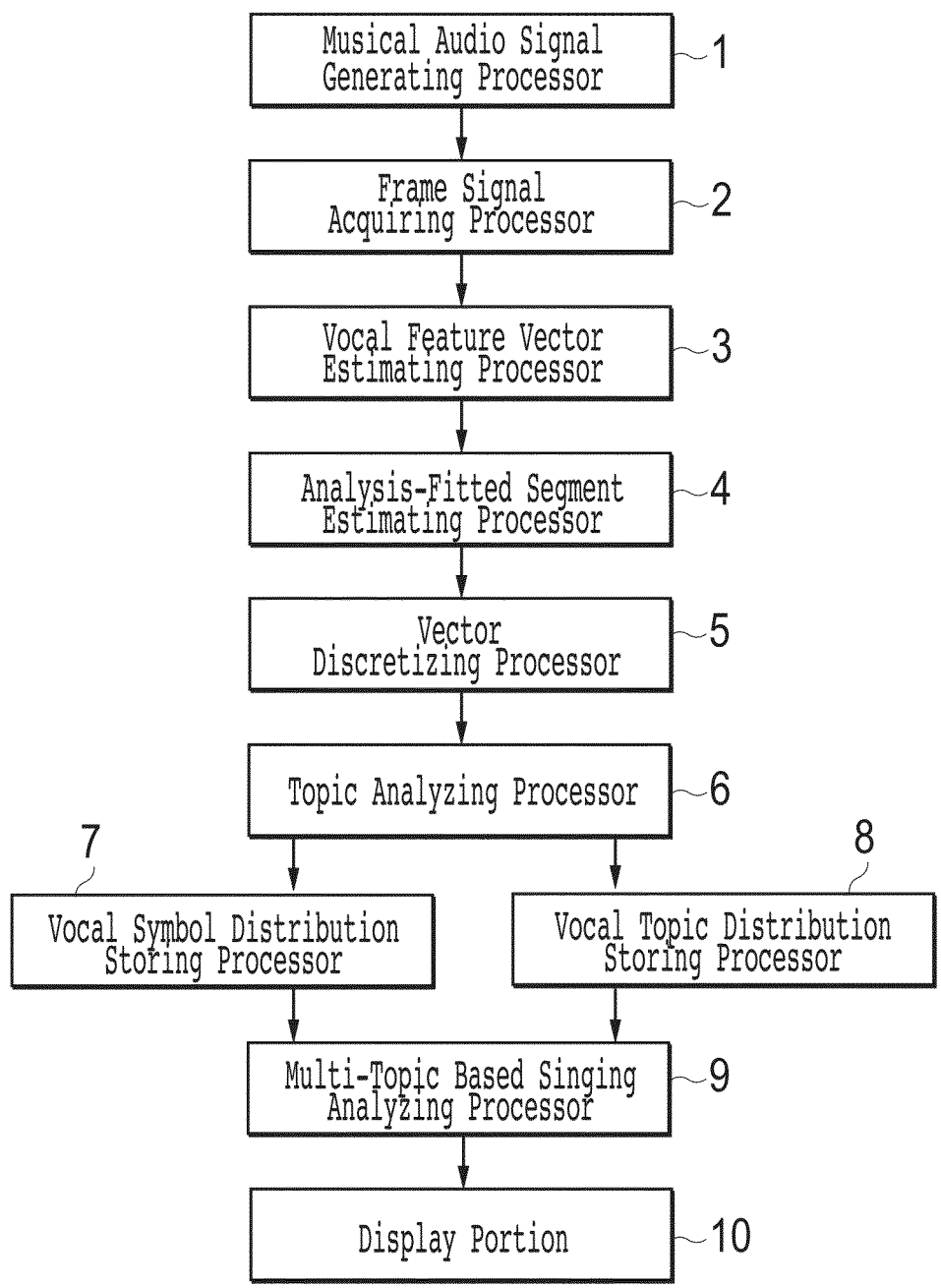

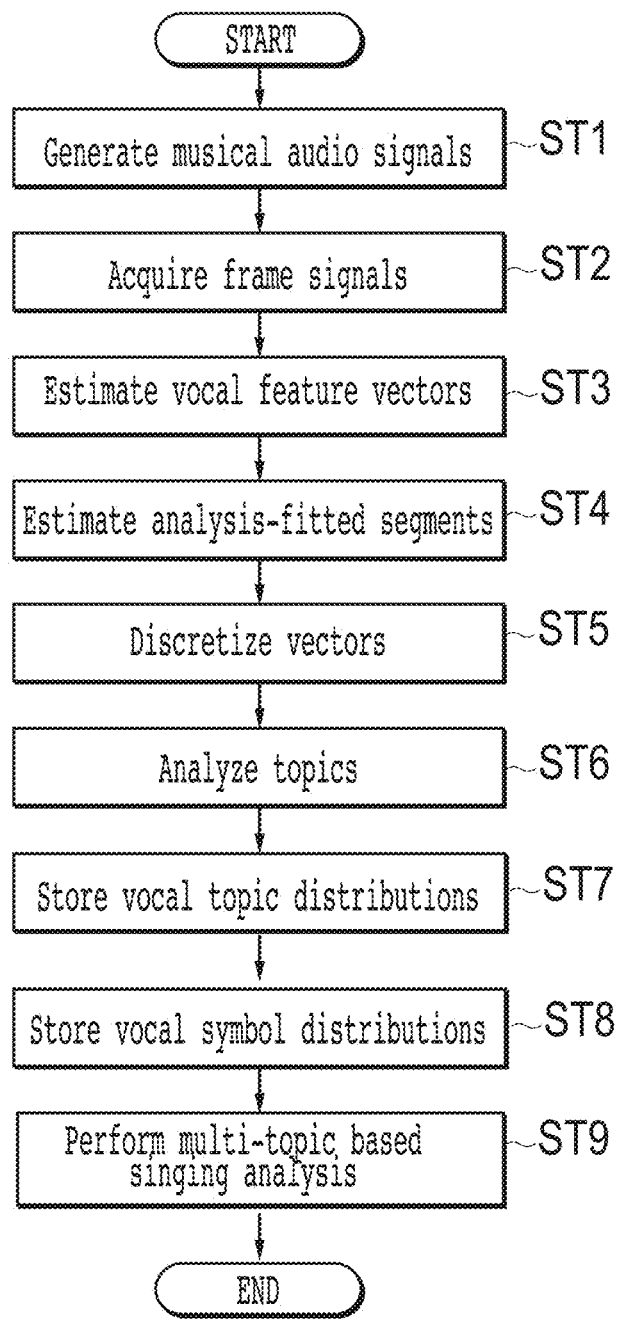

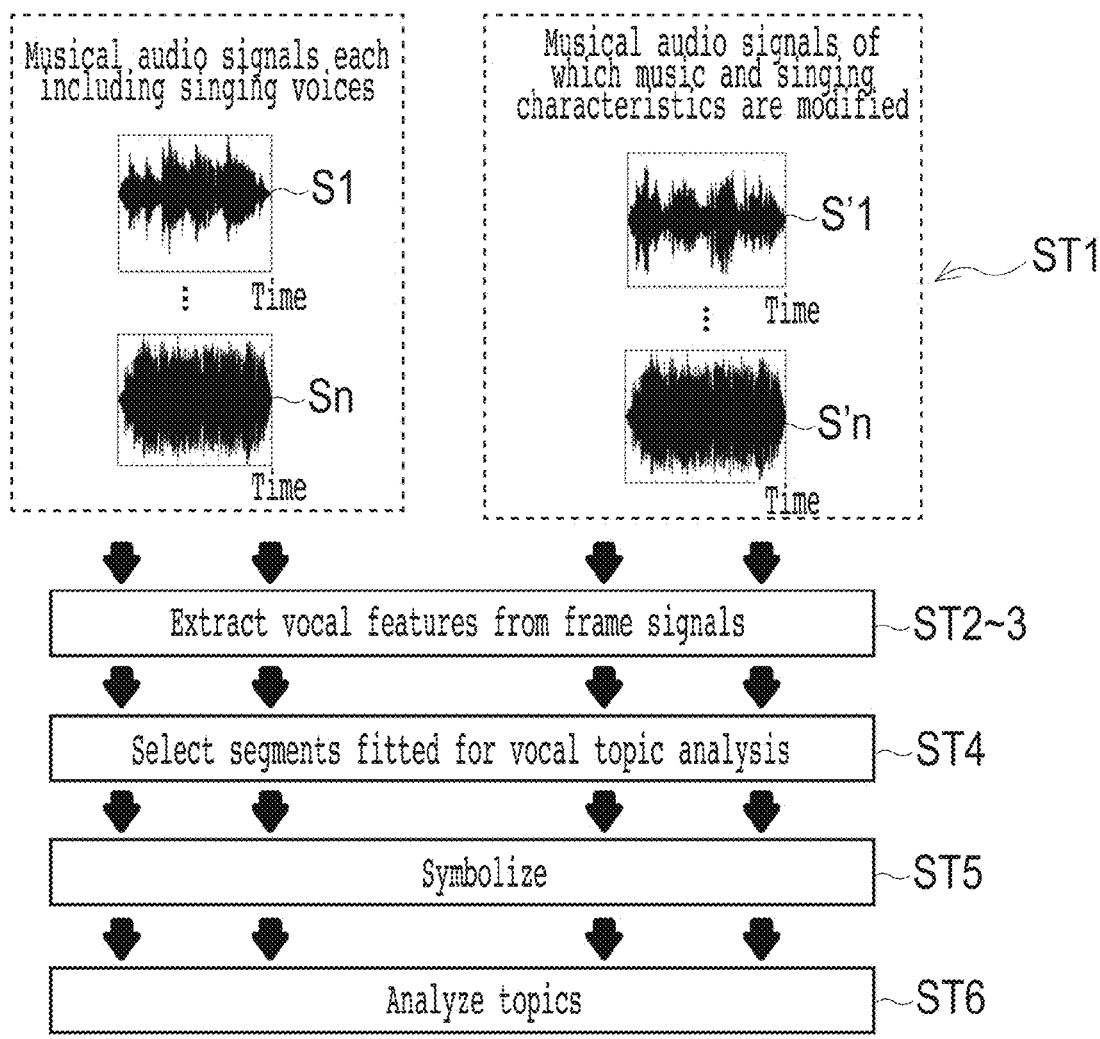

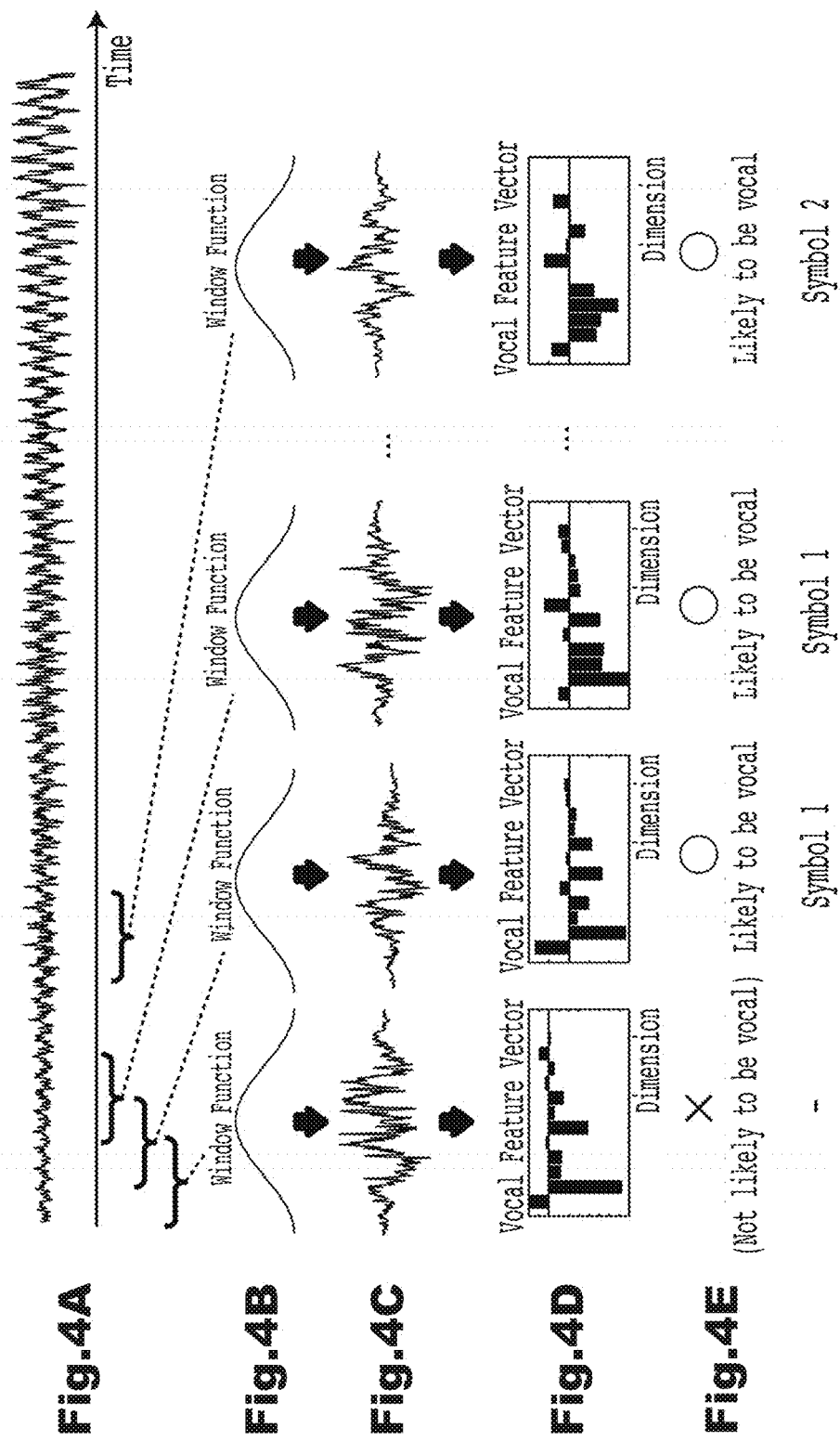

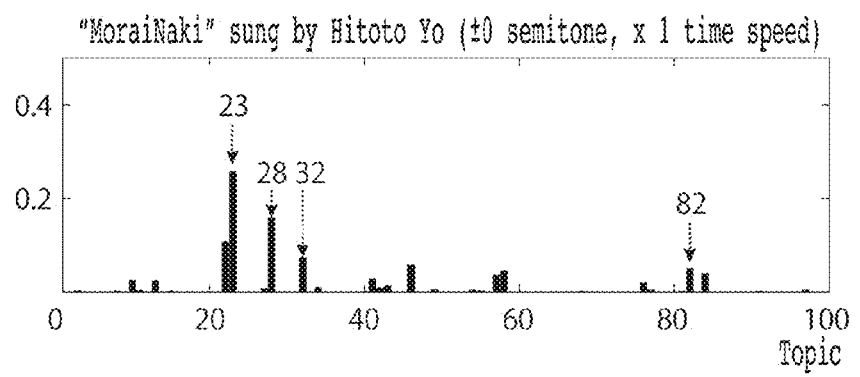
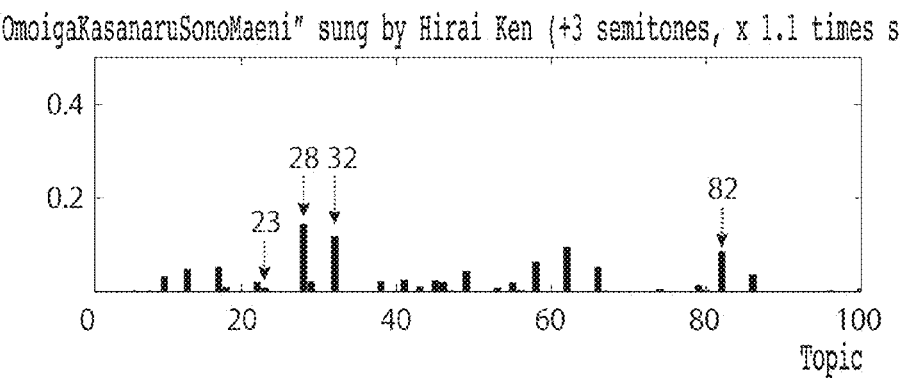

Fig.8A
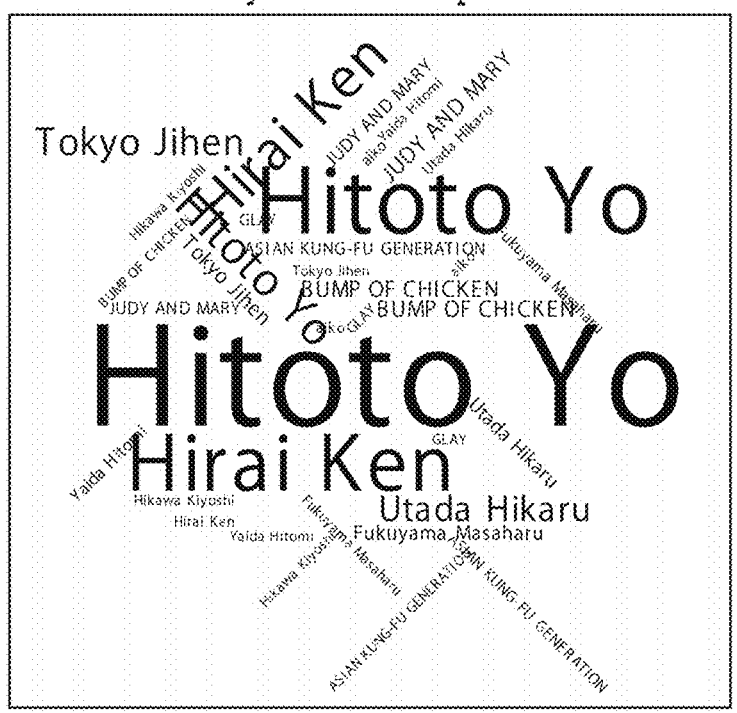
Singer Cloud of Topic 28
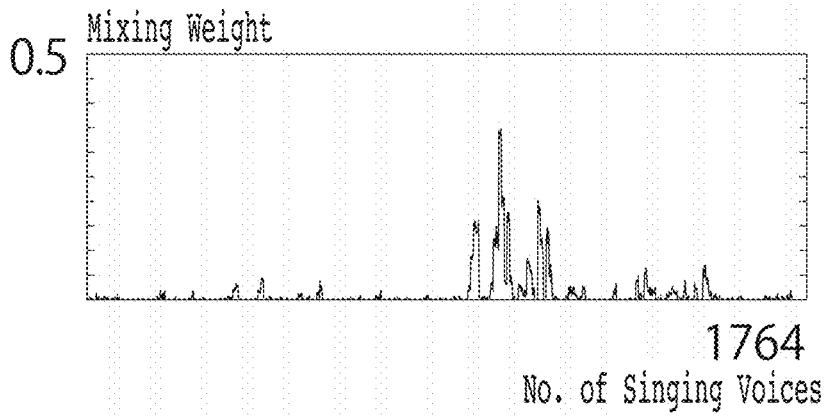

Fig.8B
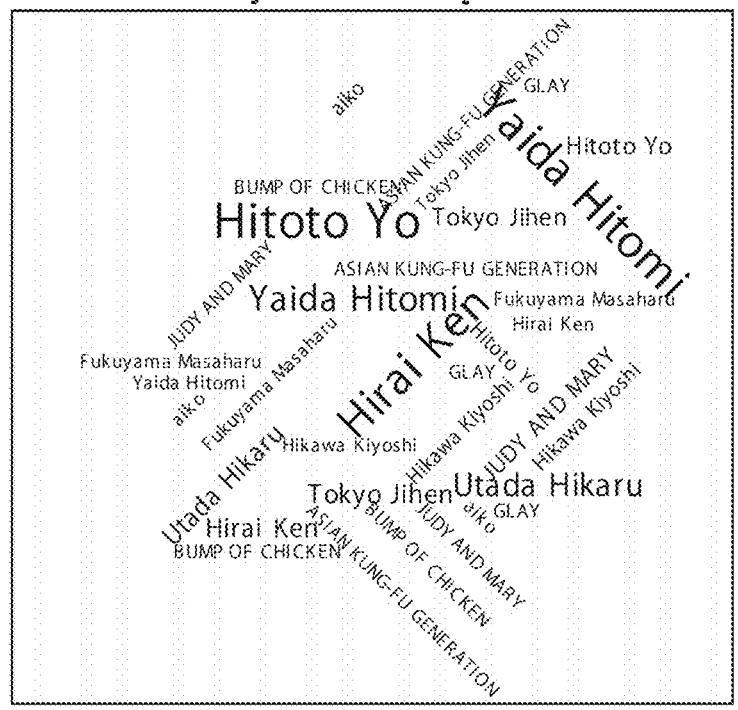
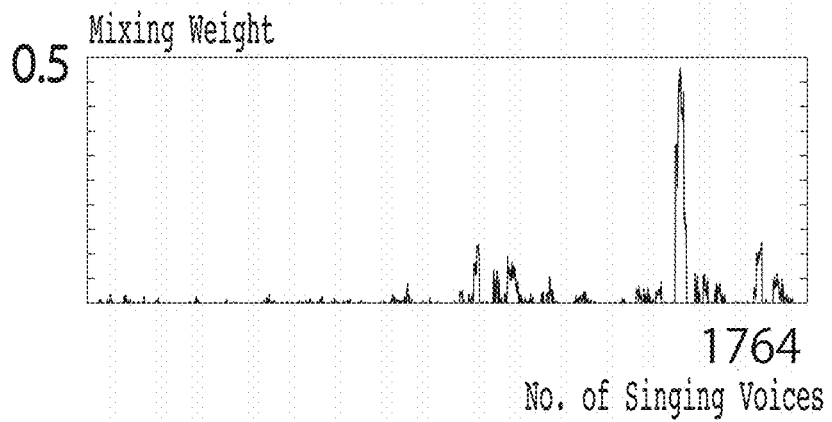

Fig.8C
Singer Cloud of Topic 82
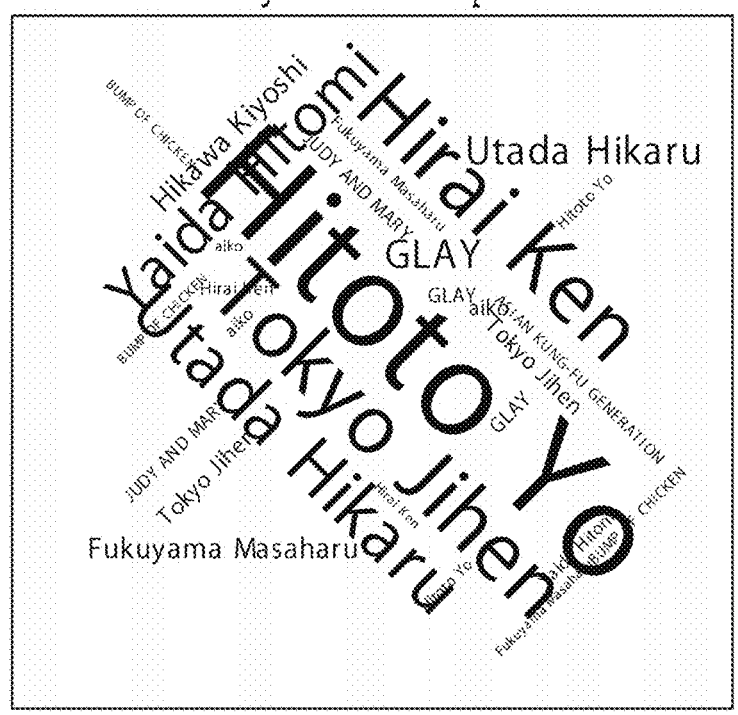
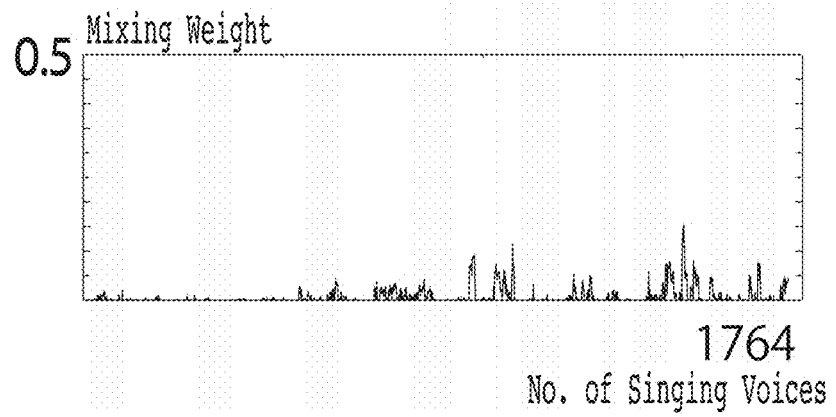

Fig.8D
Singer Cloud of Topic 23
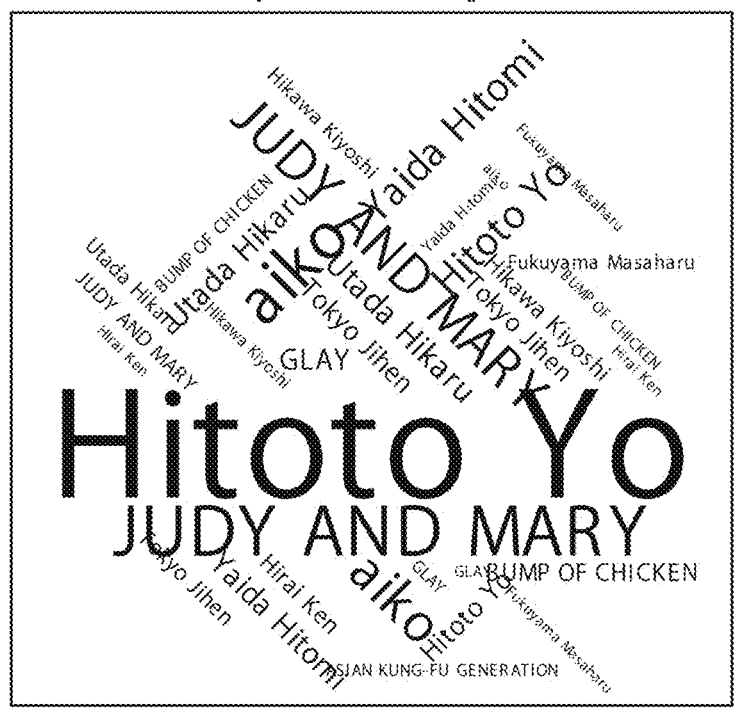
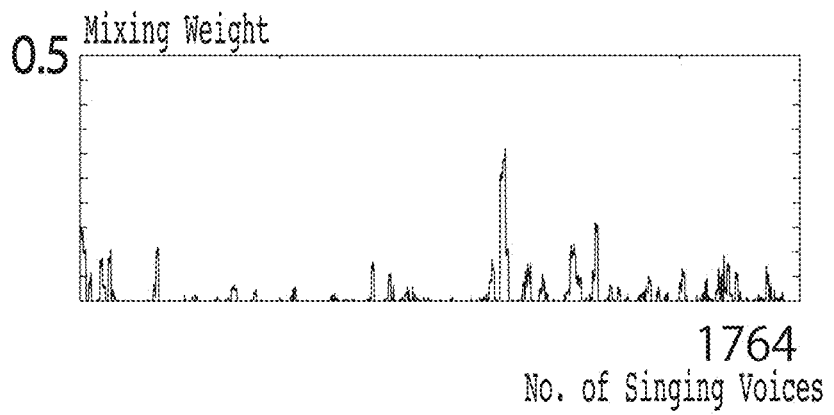

Fig.11

Singer ID of most similar song except query song

|  | M1 | M2 | M3 | M4 | M5 | M6 | F1 | F2 | F3 | F4 | F5 | F6 |
|---|---|---|---|---|---|---|---|---|---|---|---|---|
| F6 | 43 | 0 | 1 | 37 | 0 | 0 | 32 | 80 | 0 | 78 | 9 | 0 |
| F5 | 1 | 0 | 0 | 3 | 1 | 10 | 44 | 22 | 59 | 24 | 0 | 53 |
| F4 | 24 | 6 | 0 | 10 | 0 | 0 | 0 | 5 | 0 | 8 | 1 | 1 |
| F3 | 0 | 0 | 0 | 2 | 0 | 71 | 23 | 0 | 0 | 0 | 62 | 0 |
| F2 | 0 | 0 | 0 | 5 | 1 | 0 | 14 | 0 | 5 | 4 | 15 | 50 |
| F1 | 2 | 6 | 3 | 41 | 8 | 0 | 0 | 38 | 5 | 8 | 6 | 16 |
| M6 | 0 | 0 | 44 | 0 | 0 | 0 | 0 | 0 | 78 | 0 | 52 | 0 |
| M5 | 7 | 61 | 13 | 34 | 0 | 0 | 1 | 0 | 0 | 0 | 0 | 0 |
| M4 | 8 | 0 | 11 | 0 | 5 | 0 | 18 | 2 | 0 | 0 | 2 | 0 |
| M3 | 21 | 45 | 0 | 3 | 14 | 66 | 0 | 0 | 0 | 0 | 0 | 1 |
| M2 | 41 | 0 | 73 | 2 | 87 | 0 | 14 | 0 | 0 | 7 | 0 | 0 |
| M1 | 0 | 29 | 2 | 7 | 5 | 0 | 1 | 0 | 0 | 18 | 0 | 26 |

Singer ID of query song
(Query = 3 songs X 49 versions)

SYSTEM AND METHOD FOR MULTIFACETED SINGING ANALYSIS

TECHNICAL FIELD

The present invention relates to a system and a method for multifaceted singing analysis available for information retrieval of music or songs which include singing voices having some relationship in latent semantics (topics) with singing voices included in other music or songs including singing voices.

BACKGROUND ART

Music or songs are grouped into collective concepts or categories having common characteristics such as genres and moods. Conventionally, studies have been made on genre identification and mood estimation from musical audio signals. Likewise, singing voices may form a certain category according to the vocal timbre and singing style. For example, when different singers sing the same song or a song in the same musical genre, listeners may recognize differences in singing style (changing vocal timbre, pitch, and power) or may conversely feel that the singing styles of the different singers are similar. If it is possible to explain "how they are similar" in the above-mentioned similarity between the singers, it will help to improve objective understanding of singing voices and facilitate music retrieval and appreciation, and smooth communication. Further, if a certain category can be defined according to the vocal timbre and singing style, studies will be promoted to look into human relationship with music. For example, such category defined according to the vocal timbre and singing style can be utilized as a means of describing the characteristics of singing voices in analyzing the listening impressions on singing voices and the listener's selection of songs in a particular situation or scene.

Studies have been made to characterize or describe singing voices, such as "singer's characteristics" relating to the voice category and gender, "singing style characteristics" relating to fundamental frequency F0 trajectory modeling of vocal segments or singing voices, "listening impressions" relating to the listener's emotions, and "musical characteristics" relating to the musical genres and lyrics.

An invention as disclosed in JP2009-123124A (Patent Document 1), for example, utilizes a part of the above-mentioned characteristics in retrieving unknown songs or music including vocals having similar voice timbres.

In addition to the above-mentioned studies, some techniques have been proposed to analyze latent characteristics of respective vocal sounds as can be known from a plurality of singing voices. Such proposed techniques to analyze latent characteristics of singing voices are listed below (Non-Patent Documents 1 to 7).

PRIOR ART DOCUMENTS

Patent Document

Patent Document 1: JP2009-123124A

Non-Patent Documents

Non-Patent Document 1: Music retrieval based on lyrics and melodies using musical audio signals of which the characteristics are modified [E. Brochu and N. de Freitas: "'Name That Song!': Probabilistic Approach to Querying on Music and Text", Proc. of NIPS 2002 (2002)]

Non-Patent Document 2: Genre classification based on bass line [Y. Ueda, I. Tsunoo, N. Ono, and S. Sagayama ["Music Genre Classification by Latent Semantic Analysis of Bass Line", Proc. of Spring Meeting of the Acoustical Society of Japan, pp. 875-876 (2009)]

Non-Patent Document 3: Key-profile estimation by latent Dirichlet allocation (LDA) [D. J. Hu and L. K. Saul, "A Probabilistic Topic Model for Unsupervised Learning of Musical Key-Profiles", Proc. of ISMIR 2009; and D. J. Hu and L. K. Saul, "A Probabilistic Topic Model for Music Analysis", Proc. of NIPS-09 (2009)]

Non-Patent Document 4: Alignment of musical audio features with blog language and song lyrics [R. Takahashi, Y. Ohishi, N. Kitaoka, and K. Takeda ["Building and Combining Document and Music Spaces for Music Querying-By-Webpage System", Proc. of Interspeech 2008, pp. 2020-2023 (2008)]

Non-Patent Document 5: Music recommendation using social tags [P. Symeonidis, M. M. Ruxanda, A. Nanopoulos, and Y. Manolopoulos, "Ternary Semantic Analysis of Social Tags for Personalized Music Recommendation", Proc. of ISMIR 2008, pp. 219-224 (2008)]

Non-Patent Document 6: Musical similarity estimation using the hierarchical Dirichlet process (HDP) [M. Hoffman, D. Blei and P. Cook, "Content-based Musical Similarity Computation Using the Hierarchical Dirichlet Process", Proc. of ISMIR 2008 (2008)]

Non-Patent Document 7: Musical clustering based on self-organizing map (SOM) [E. Pampalk, "Islands of Music: Analysis, Organization and Visualization of Music Archives", Master's Thesis, Vienna University of Technology (2001)]

SUMMARY OF INVENTION

Technical Problem

There have been no techniques available for latent semantics based analysis of audio features in connection with the vocal timbre and singing style. Accordingly, it has been impossible so far to acquire information on songs which include singing voices having some relationship in latent semantics (topics).

An object of the present invention is to provide a system and a method for multifaceted singing analysis available for information retrieval of songs or music which includes singing voices having some relationship in latent semantics (topic) with singing voices included in other songs or music including singing voices. This object is accomplished by estimating vocal feature vectors from musical audio signals of a plurality of songs or music including singing voice, and analyzing singing voices based on the results obtained from the analysis of the estimations by using a topic model.

Solution to Problem

In one aspect of the present invention, a system for multifaceted singing analysis is provided. The system includes a musical audio signal generating processor, a frame signal acquiring processor, a vocal feature vector estimating processor, an analysis-fitted segment estimating processor, a vector discretizing processor, a topic analyzing processor, a vocal topic distribution storing processor, a vocal symbol distribution storing processor, and a multifaceted analyzing processor.

The musical audio signal generating processor generates one or more modified musical audio signals, of which music and vocal characteristics are modified, from each of musical audio signals of music including singing voice. Specifically, the musical audio signal generating processor may generate modified musical audio signals by shifting pitches of the musical audio signals of music including singing voice. Alternatively, the musical audio signal generating processor may generate modified musical audio signals by shifting tempos of the musical audio signals of music including singing voice. Such musical audio signal processor, for example, may modify a song including male singing voice into the one similar to a song including female singing voice. As a result, several tens of thousands of musical audio signals may be generated from the musical audio signals of 10,000 target songs, thereby readily increasing the number of target songs in the analysis. Further, it allows the listener to encounter music or songs sharing some relationship in latent semantics. Such encounter with unknown or virtual songs cannot be expected with conventional techniques.

The frame signal acquiring processor acquires a plurality of frame signals in time series from each of the musical audio signals by applying a predetermined window function to one of the musical audio signal of music including singing voice and the one or more modified musical audio signals. An arbitrary window function may be used, but a preferred window function is the one which can acquire an appropriate number of frame signals for the analysis.

The vocal feature vector estimating processor estimates a plurality of vocal feature vectors for each of the frame signals acquired from each of the musical audio signals. The vocal feature vector relates to a singing voice and is determined in advance. For example, the vocal feature vector is represented by a linear predictive mel-cepstral coefficient of the singing voice and $\Delta F0$ indicative of temporal changes in fundamental frequency (F0) of the singing voice. It is arbitrary what vocal feature vector should be used.

The analysis-fitted segment estimating processor estimates analysis-fitted segments by determining whether or not each segment in the frame signals is fitted for analysis, based on the vocal feature vectors as estimated by the vocal feature vector estimating processor. Publicly known techniques may be used in estimating analysis-fitted segments. For example, vocal segments may be estimated as the analysis-fitted segments. Use of vocal feature vectors in the analysis-fitted segments may enhance the analysis precision in latent semantics of the singing voice.

The vector discretizing processor discretizes a plurality of vocal feature vectors in the analysis-fitted segments to convert them into a vocal symbolic time series composed of a plurality of vocal symbols. An arbitrary discretization technique may be employed. A k-means algorithm, for example, may be used for discretization. The vocal feature vectors are analog data. A typical approach, latent Dirichlet allocation (LDA) designed to analyze latent characteristics has been developed to analyze discrete data such as text. In the latent Dirichlet allocation (LDA) approach, analog data cannot be dealt with as input data. For this reason, the vector discretizing processor converts a plurality of vocal feature vectors into a vocal symbolic time series composed of a plurality of vocal symbols such that the analog data may be grasped as discrete data such as text.

The term "vocal symbol" used herein refers to each class defined as one vocal symbol when dividing feature vectors in each of P frames into Q groups (classes) where Q is smaller than P in size and P and Q are an integer of 2 or more, respectively. In the k-means algorithm, for example, a mean feature vector is estimated as a representative feature vector for a vocal symbol. Distances from Q mean vectors are calculated for each of P vocal feature vectors. Then, the class of a mean feature vector having the shortest distance is allocated as a vocal symbol in a vocal symbolic time series. Although $Q \leq P$ may not always be true, in the present implementation of the present invention using the k-means algorithm, $Q \leq P$.

The topic analyzing processor analyzes, using a topic model, a plurality of vocal symbolic time series obtained for the respective musical audio signals of music including singing voice and the modified musical audio signals. The topic analyzing processor generates a vocal topic distribution for each of all the musical audio signals. The vocal topic distribution is composed of a plurality of vocal topics each indicating a relationship of one of the musical audio signals with the other musical audio signals. The topic analyzing processor further generates a vocal symbol distribution for each of all the vocal topics. The vocal symbol distribution indicates respective occurrence probabilities for the vocal symbols. The vocal symbol distribution storing processor stores the vocal symbol distributions generated by the topic analyzing processor. The vocal topic distribution storing processor stores the vocal topic distributions generated by the topic analyzing processor.

The vocal topic distribution is used in stochastically representing the process in which the singing voice of each song is generated based on the latent semantics (vocal topics). By using a topic model, a latent structure inherent in each singing voice may be extracted and singing similarity may be calculated. The term "vocal topics" used herein is defined as (K) factors shared by D singing voices (where D is an integer of two or more). The vocal topic is determined by how N vocal symbols (any of 1 to Q) occur (where N denotes the total number of frames for D singing voices). For example, vocal topics may be estimated assuming K=100 in advance.

The multifaceted singing analyzing processor performs multifaceted analysis of singing voices respectively included in a plurality of musical audio signals of music including singing voice and a plurality of modified musical audio signals, based on the vocal topic distributions stored in the vocal topic distribution storing processor and the vocal symbol distributions stored in vocal symbol distribution storing processor. The multifaceted singing analyzing processor may employ an arbitrary analyzing technique. For example, the multifaceted singing analyzing processor may be configured to display singing similarities between a plurality of songs on a display portion. Alternatively, the multifaceted singing analyzing processor may be configured to perform analysis to determine whether or not one of the singing voices included in the musical audio signals of music including singing voice and the modified musical audio signals is similar to another singing voice included in the musical audio signals of music including singing voice and the modified musical audio signals, based on the vocal topic distributions and the vocal symbol distributions.

The musical audio signals may be accompanied by metadata. In this case, the multifaceted singing analyzing processor displays at least a part of the metadata together with analysis results when displaying the analysis results on a display portion. A part of the metadata displayed on the display portion allows the viewer to recognize the information included in the metadata, thereby enhancing the utilization of analysis results.

If a musical audio signal of a song is accompanied by a singer's name as metadata, the multifaceted singing analyzing processor can display the singer's name together with analysis results on the display portion. For example, the semantics of singing voices and topics can be visualized by displaying the names of predominant singers using a word-cloud based approach with the display sizes of the respective singers' names in proportion to the occupancy or occupying ratios of the respective singers in the vocal topic distributions and the vocal symbol distributions for each of the vocal topic distributions. With such word-could display, the viewer can imagine the vocal timbre from the singer's name when viewing the analysis results, thereby enabling the viewer to assume more latent semantics from the analysis results.

In the word-cloud based approach, the singers' names may be designed to be displayed at different positions with different sizes, thereby allowing for retrieval of singing similarities between the singers or songs. If how distant the singers' names are displayed from each other is in proportion to the singing similarities between the singers or songs, retrieval of songs will be facilitated by judging from the positions at which the singers' names are displayed. For example, a song sung with a singing voice similar to that of one particular song can be retrieved more easily. In this case, if a male singer's name and a female singer's name are displayed adjacent to each other, cross-gender similar singers can be retrieved. Further, if singing similarities are calculated throughout the topic distributions, an overall evaluation of singing similarities will be possible. On the other hand, if singing similarities are calculated in each topic distribution, an evaluation of singing similarities is focused on one particular topic, which facilitates the analysis of "how similar".

In another aspect of the present invention, a method for multifaceted singing analysis is provided. The method is implemented in a computer to cause the computer to execute the steps of generating one or more modified musical audio signals, acquiring frame signals, estimating vocal feature vectors, estimating analysis-fitted segments, discretizing vectors, analyzing topics, storing vocal topic distributions, storing vocal symbol distributions, and performing multifaceted analysis of singing voices. In the step of generating one or more modified musical audio signals, one or more musical audio signals, of which music and vocal characteristics are modified, are generated from musical audio signals of music including singing voice. In the step of acquiring frame signals, a plurality of frame signals are acquired in time series from each of the musical audio signals by applying a predetermined window function to one of the musical audio signal of music including singing voice and one or more modified musical audio signals. In the step of estimating vocal feature vectors, a plurality of vocal feature vectors are estimated for each of the frame signals acquired from each of the musical audio signals. In the step of estimating analysis-fitted segments, it is determined whether or not each segment in the frame signals is fitted for analysis, based on the vocal feature vectors as estimated in the step of estimating vocal feature vectors. In the step of discretizing vectors, a plurality of vocal feature vectors in the analysis-fitted segments are discretized and converted into a vocal symbolic time series composed of a plurality of vocal symbols.

In the step of analyzing topics, a plurality of vocal symbolic time series obtained for the respective musical audio signals of music including singing voice and the modified musical audio signals are analyzed by using a topic model. Then, a vocal topic distribution is generated for each of all of the musical audio signals. Here, the vocal topic distribution is composed of a plurality of vocal topics each indicating a relationship of one of the musical audio signals with the other musical audio signals. In addition, a vocal symbol distribution is generated for each of all the vocal topics. Here, the vocal symbol distribution indicates respective occurrence probabilities for the vocal symbols. In the step of storing vocal topic distributions, the vocal topic distributions generated by the step of analyzing topics are stored in a vocal topic distribution storing processor. In the step of storing vocal symbol distributions, the vocal symbol distributions generated by the step of analyzing topics are stored in a vocal symbol distribution storing processor. In the step of performing multifaceted singing analysis, singing voices respectively included in a plurality of musical audio signals of music including singing voice and a plurality of modified musical audio signals are analyzed in the multifaceted viewpoint.

A computer program for multifaceted singing analysis of the present invention is a computer program to be installed in a computer to cause the computer to execute the steps as mentioned above. This computer program is recorded on a non-transitory computer-readable recording medium.

BRIEF DESCRIPTION OF DRAWINGS

FIG. 1 is a block diagram illustrating an example configuration of the system for multifaceted singing analysis according to an embodiment of the present invention.

FIG. 2 illustrates an algorithm for an embodiment of the present invention implemented in a computer.

FIG. 3A is an auxiliary illustration to help to understand the algorithm of FIG. 2.

FIGS. 4A to 4F are illustrations used to explain the flow of data processing in the system for multifaceted singing analysis of FIG. 1.

FIGS. 7A and 7B illustrate the mixing weights of topics in the songs respectively sung by Hitoto Yo and Ken Hirai.

FIG. 8A illustrates an example singer cloud.

FIG. 8B illustrates another example singer cloud.

FIG. 8C illustrates a further example singer cloud.

FIG. 8D illustrates a further example singer cloud.

FIG. 11 illustrates the total number of singers of the highest similarity songs in the analysis using the whole parts of the respective songs wherein 36 songs (12 singers×3 songs) are used as queries and 1715 songs (1764 songs minus 49 songs that are the query songs and their modified songs of which musical characteristics are modified).

DESCRIPTION OF EMBODIMENTS

Figure 3B:
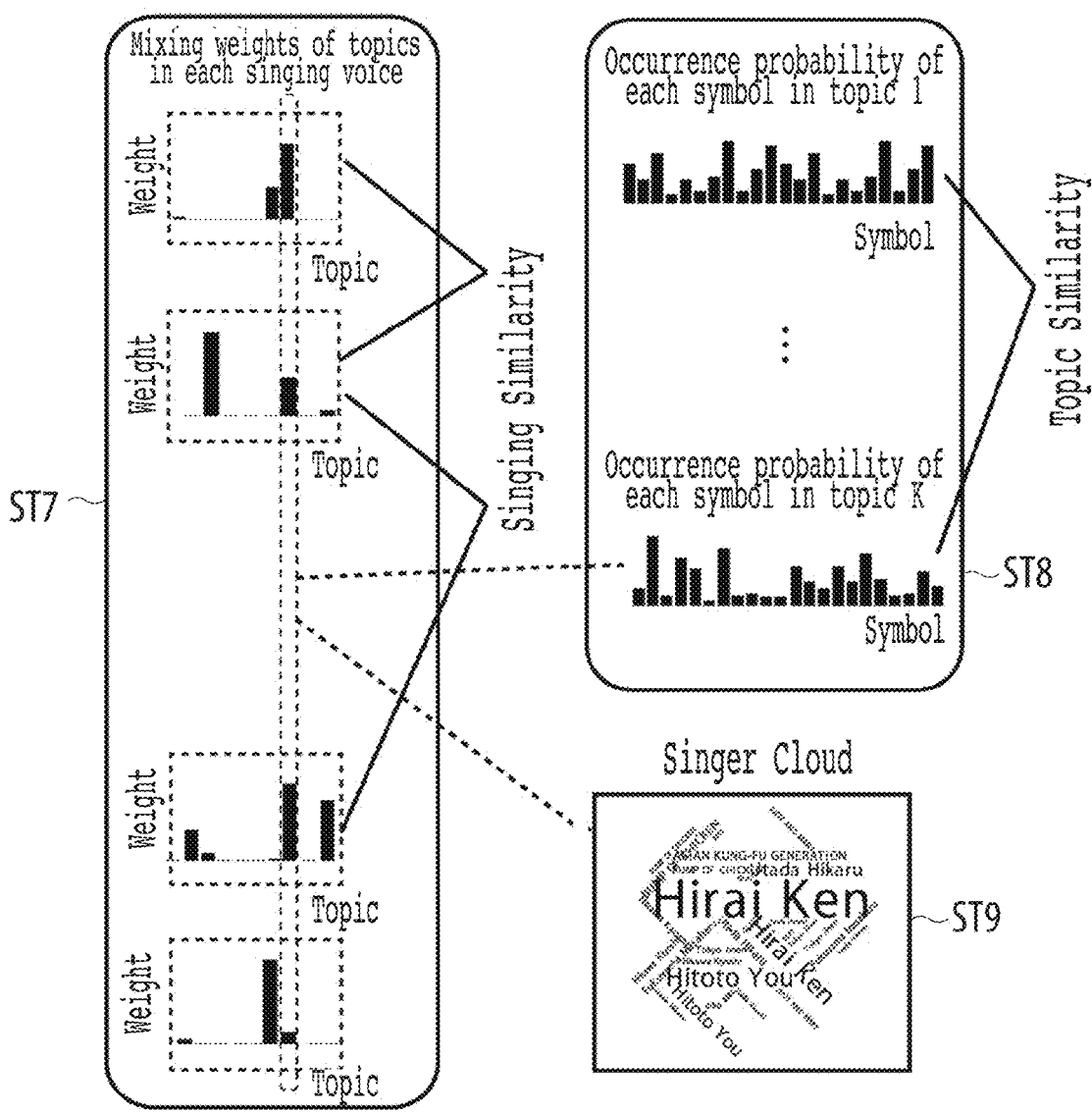
FIG. 3B is an auxiliary illustration to help to understand the algorithm of FIG. 2.

Now, with reference to the accompanying drawings, embodiments of the present invention will be described below in detail. FIG. 1 is a block diagram illustrating an example configuration of the system for multifaceted singing analysis according to the present embodiment. FIG. 2 illustrates an algorithm for the present embodiment implemented in a computer. FIGS. 3A and 3B are auxiliary illustrations to help to understand the algorithm of FIG. 2. FIGS. 4A-4F are used to explain the flow of data processing in the system of FIG. 1. The illustrated system is implemented in a computer. Accordingly, each block illustrated in FIG. 1 represents a means for implementing the system of the present invention in a computer in which a computer program has been installed. The system for multifaceted singing analysis includes a musical audio signal generating processor 1, a frame signal acquiring processor 2, a vocal feature vector estimating processor 3, an analysis-fitted segment estimating processor 4, a vector discretizing processor 5, a topic analyzing processor 6, a vocal symbol distribution storing processor 7, a vocal topic distribution storing processor 8, a multifaceted singing analyzing processor 9, and a display portion 10 as implementing means.

The musical audio signal generating processor 1 (step ST1 of generating one or more modified musical audio signals) generates one or more modified musical audio signals S1'-Sn', of which music and vocal characteristics are modified, from musical audio signals S1-Sn of music including singing voice, as illustrated in FIG. 3A. Specifically, in the present embodiment, the musical audio signal generation processor 1 generates pitch-shifted musical audio signals by shifting the pitches of the musical audio signals and tempo-shifted musical audio signals by shifting the tempos of the musical audio signals as the modified musical audio signals S1'-Sn'. The musical audio signals S1-Sn including singing voice and the modified musical audio signals S1'-Sn' are preferably stored in a signal storing portion, not illustrated, for a reproduction purpose. Providing such musical audio signal generating processor 1 may modify a song including male singing voice, for example, into a song similar to a song including female singing voice. As a result, several tens of thousands of modified musical audio signals may be generated from 10,000 musical audio signals including singing voice, thereby readily increasing the number of target musical audio signals in the analysis. This also enables an encounter with other songs having some relationship in latent semantics. Such encounter of unknown or virtual songs cannot be expected with the conventional techniques. Further, cross-gender singing analysis can be attained by pitch shifting of musical audio signals, which eliminates influences due to the difference in vocal tract length between male and female singers. The difference in singing speed can be absorbed by introducing tempo shifting of musical audio signals.

In the musical audio signal generating processor 1, for example, pitch-shifted signals are generated by shifting the pitches up or down along the frequency axis according to the results of short-term frequency analysis. This shifting is equivalent to expansion/contraction of the vocal tract. Tempo-shifted musical audio signals are generated by WSOLA (Waveform Similarity Based Overlap-Add). Thus, singing voices having different singing speeds are generated. Publicly known techniques may be used to generate these modified musical audio signals. Refer to http://sox.sourceforge.net/, for example.

The frame signal acquiring processor 2 (step ST2 of acquiring frame signals) applies a predetermined window function [see FIG. 4B] to one [see FIG. 4A] of the musical audio signals of music including singing voice and one or more modified musical audio signals to acquire a plurality of frame signals [see FIG. 4C] by sampling in time series from each of the musical audio signals. An arbitrary window function may be used, but a preferred window function is the one which can acquire an appropriate number of frame signals for the analysis. Specifically in the present embodiment, the sampling interval for the frame signals is about 10 msec.

The vocal feature vector estimating processor 3 (step ST3 of estimating vocal feature vectors) estimates a plurality of vocal feature vectors [see FIG. 4D] for each of the frame signals acquired from each of the musical audio signals. The vocal feature vector relates to singing voice and is predetermined. In the present embodiment, the vocal feature vector (vocal feature) is represented by a linear predictive mel-cepstral coefficient (12 dimensions) of the singing voice and $\Delta F0$ (one dimension) indicative of temporal changes in fundamental frequency F0 of the singing voice. An arbitrary vocal feature vector may be used. Specifically in the present embodiment, a module from a publicly known web service for active music listening is used to estimate vocal feature vectors. For details on this module, refer to "Songle: An Active Music Listening Service Enabling Users to Contribute by Correcting Errors", by M. Goto, K. Yoshii, H. Fujihara, M. Mauch, and T. Nakano, Interaction 2012, pp. 1-8 (2012). Specifically, an approach called PreFEst, which estimates the most predominant pitch from mixed sounds, is used to estimate a vocal melody. Refer to "A Real-time Music Scene Description System: Predominant-F0 Estimation for Detecting Melody and Bass Lines in Real-world Audio Signals" by M. Goto, Speech Communication, Vol. 43, No. 4, pp. 311-329 (2004).29. Then, frame signals with high vocal likelihood are selected by high reliability frame selection using vocal and non-vocal GMM (Gaussian Mixture Model), and LPMCC (liner predictive mel-cepstral coefficient) and $\Delta F0$ are estimated as a vocal feature vector. Refer to "A Modeling of Singing Voice Robust to Accompaniment Sounds and Its Application to Singer Identification and Vocal-Timbre-Similarity Based Music Information Retrieval" by H. Fujihara, M. Goto, T. Kitahara, and H. G. Okuno, IEEE Trans. on ASLP, Vol. 18, No. 3, pp. 638-648 (2010).26. Finally, all of the vocal feature vectors are normalized in each dimension by subtracting the mean and dividing by the standard deviation. Here, it is considered that a vocal feature vector related to a spectral envelope such as LPMCC is an important feature not only for singer identification but also for discussion on "singing styles" since it has been reported that a spectral envelope changes in shape when a singer mimics the singing style of another singer. Refer to "A proposal of acoustic feature related to voice quality for estimation of similarity in singing voice" by C. Suzuki, H. Bannno, F. Itakura, and M. Morise, IEICE, NLC Report SP, Vol. 111, No. 364, pp. 79-84 (2011) and "Acoustic effects of vocal mimicking in amateur singing" by T. Saito and K. Sakakibara, Document of Technical Committee of Psychological and Physiological Acoustics (2011). The process described so far is executed in step ST1 of FIG. 2.

The analysis-fitted segment estimating processor 4 (step ST4 of estimating analysis-fitted segments) estimates analysis-fitted segments by determining whether or not each segment in the frame signals is fitted for analysis, based on the vocal feature vectors as estimated by the vocal feature vector estimating processor 3. For example, non-vocal segments including accompaniment sounds only or those segments including very large accompaniment sounds are not fitted for analysis. Publicly known techniques may be used to estimate analysis-fitted segments. For example, vocal segments may be estimated as analysis-fitted segments and vocal feature vectors in the vocal segments may be used in the analysis, thereby enhancing the analysis precision of the latent semantics of singing voices. An example of vocal segment estimation (analysis-fitted segments) is described in detail in JP 2009-123124 A. In FIG. 4E, those segments with high vocal likelihood are determined as being fitted for analysis and are each indicated with a circle symbol "○", and those segments with low vocal likelihood are determined as not being fitted for analysis and indicated with a symbol "×". The above process is executed in step ST4 of FIGS. 2 and 3A.

The vector discretizing processor 5 (step ST5 of discretizing vectors) discretizes a plurality of vocal feature vectors in the analysis-fitted segments to convert them into a vocal symbolic time series composed of a plurality of vocal symbols [step ST5 of FIGS. 2 and 3A]. An arbitrary discretizing technique may be used. In the present embodiment, a k-means algorithm is used for discretization. Vocal feature vectors are analog data. A typical approach, Latent Dirichlet Allocation (LDA) which analyzes latent characteristics has been developed to analyze discrete data such as text. LDA cannot deal with analog data as input data in the analysis. Then, the vector discretizing processor 5 converts the vocal feature vectors into a vocal symbolic time series composed of a plurality of vocal symbols such that the vocal feature vectors may be deal with as discrete data such as text. FIG. 4F illustrates example vocal symbol time series. In FIG. 4F, predetermined symbols or marks such as "Symbol 1" and "Symbol 2" which are capable of identifying a group or class are allocated to the vocal symbols. The term "vocal symbol" used herein refers to each class defined as one vocal symbol when dividing feature vectors in each of P frames into Q groups (classes) where Q is smaller than P in size and P and Q are an integer of 2 or more, respectively. M and N are each a positive integer. In the k-means algorithm, for example, a mean feature vector is estimated as a representative feature vector for a vocal symbol. Distances from Q mean vectors are calculated for each of P vocal feature vectors. Then, the class of a mean feature vector having the shortest distance is allocated as a vocal symbol in a vocal symbolic time series. Although Q≤P may not always be true, in the present implementation of the present invention using the k-means algorithm, Q≤P.

The topic analyzing processor 6 uses a topic model, namely, a latent Dirichlet allocation (LDA) approach to analyze a plurality of the vocal symbolic time series obtained for the respective musical audio signals of music including singing voice and the modified musical audio signals thereof [in step ST6 of FIGS. 2 and 3A]. The latent Dirichlet allocation (LDA) used in the present embodiment is described in detail in "Latent Dirichlet Allocation" by D. M. Blei, A. Y. Ng, and M. I. Jordan, Journal of Machine LearningResearch, Vol. 3,pp. 993-1022 (2003). The topic analyzing processor 6 generates a vocal topic distribution for each of all the musical audio signals. The vocal topic distribution is composed of a plurality of vocal topics each indicating a relationship of one of the musical audio signals with the other musical audio signals. The term "vocal topics" used herein is defined as (K) factors shared by D singing voices. The vocal topic is determined by how N vocal symbols (any of 1 to Q) occur (where N denotes the total number of frames for D singing voices). For example, vocal topics may be estimated assuming K=100 in advance.

Step ST7 of FIG. 3B illustrates an example generated vocal topic distribution to be stored in the vocal topic distribution storing processor 8. One vocal topic distribution is generated for each of the musical audio signals with the lateral axis of a plurality of topics included in the musical audio signal including singing voice and the vertical axis of their mixing weights. Assuming that 10,000 musical audio signals are to be analyzed, 10,000 vocal topic distributions are generated. In addition to the generation of vocal topic distributions, the topic analyzing processor 6 generates a vocal symbol distribution for each of all the vocal topics whereby the vocal symbol distribution indicates respective occurrence probabilities for the vocal symbols, and stores the vocal symbol distributions in the vocal symbol distribution storing processor 7 [in step ST8 of FIG. 3B]. As illustrated in step ST8 of FIG. 3B, the vocal symbol distribution indicates an occurrence probability (vertical axis) of each of vocal topics (lateral axis). Thus, a plurality of vocal symbol distributions are generated for each of the vocal topics. Similarities between vocal topics can be grasped, for example, by comparing one vocal symbol distribution with another. The vocal symbol distribution storing processor 7 (step ST7 of storing vocal symbol distributions) stores a plurality of vocal symbol distributions generated by the topic analyzing processor 6. The vocal topic distribution storing processor 8 (step ST8 of storing vocal topic distributions) stores a plurality of vocal topic distributions generated by the topic analyzing processor 6.

Now, the analysis by latent Dirichlet allocation (LDA) will be described below in detail. Here, D independent singing voices $X=\{X_1, \ldots, X_D\}$ are assumed as model training data in the latent Dirichlet allocation (LDA) approach. $X_1$ is the first vocal symbolic time series and $X_D$ is the D-th vocal symbolic time series. Here, since the observed data for LDA are discretized vocal time series, and singing voices can be analyzed by using ordinary latent Dirichlet allocation approach.

A singing voice $X_d$ is a vocal symbolic time series composed of $N_d$ vocal symbols, and is represented by $X_d=\{X_{d,1}, \ldots, X_{d,Nd}\}$. Here, $X_{d,1}$ represents an occurrence probability for the first vocal symbol and $X_{d,Nd}$ represents an occurrence probability for the $N_d$-th vocal symbol. The vocabulary size V of vocal symbols is equivalent to the number of clusters in the k-means algorithm. $X_{d,n}$ is a V-dimensional vector in which one element corresponding to the vocal symbol selected from the vocabulary contains a 1 and all other elements each contain a 0.

Figure 5:
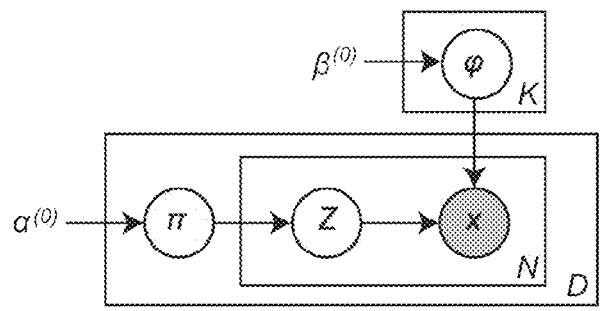
FIG. 5 is a graphical representation of latent Dirichlet allocation model.

The latent variable series (vocal topic distribution) of the observed singing voice $X_d$ is $Z_d=\{Z_{d,1}, \ldots, Z_{d,Nd}\}$. Defining the number of topics as K, $Z_{d,n}$ represents a K-dimensional vector in which one element (mixing weight) corresponding to the selected topic contains a 1 and all other elements each contain a 0. Hereafter, the latent variable series (vocal topic distributions) of all the observed singing voices are represented by $Z=\{Z_1, \ldots, Z_D\}$. Taking account of the conditional independency between the variables as illustrated in a graphical representation of FIG. 5, the full joint distribution is given by the following expression.

<Expression 1>

$$p(X, Z, \pi, \phi)=p(X|Z, \phi)p(Z|\pi)p(\pi)p(\phi) \quad (1)$$

In the above expression, π indicates the mixing weights of the multiple topics (D K-dimensional vectors), and φ indicates the unigram probability of each topic (K V-dimensional vectors), namely, the vocal symbol distribution indicating the occurrence probabilities of the vocal symbols.

The first two terms assume discretization distributions based on a multinomial distribution.

⟨Expression 2⟩

$$p(X \mid Z, \phi) = \prod_{d=1}^{D} \prod_{n=1}^{N_d} \sum_{v=1}^{V} \left( \prod_{k=1}^{K} \phi_{k,v}^{z_{d,n,k}} \right)^{x_{d,n,v}} \quad (2)$$

⟨Expression 3⟩

$$p(Z \mid \pi) = \prod_{d=1}^{D} \prod_{n=1}^{N_d} \sum_{v=1}^{V} \pi_{d,k}^{z_{d,n,k}} \quad (3)$$

The other two terms assume conjugate prior distributions, namely, Dirichlet distributions in the multinomial distribution.

⟨Expression 4⟩

$$p(\pi) = \prod_{d=1}^{D} \mathrm{Dir}(\pi_d \mid \alpha^{(0)}) = \prod_{d=1}^{D} C(\alpha^{(0)}) \prod_{k=1}^{K} \pi_{d,k}^{\alpha^{(0)}-1} \quad (4)$$

⟨Expression 5⟩

$$p(\phi) = \prod_{k=1}^{K} \mathrm{Dir}(\phi_k \mid \beta^{(0)}) = \prod_{k=1}^{K} C(\beta^{(0)}) \prod_{v=1}^{V} \phi_{k,v}^{\beta^{(0)}-1} \quad (5)$$

In the above expressions, $\alpha^{(0)}$ and $\beta^{(0)}$ are hyperparameters, and $C(\alpha^{(0)})$ and $C(\beta^{(0)})$ are normalization factors for the Dirichlet distribution as calculated below.

⟨Expression 6⟩

$$C(x) = \frac{\Gamma(\hat{x})}{\Gamma(x_1) \ldots \Gamma(x_I)}, \hat{x} = \sum_{i=1}^{I} x_i \quad (6)$$

The multifaceted singing analyzing processor 9 (step ST9 of performing multifaceted singing analysis) performs multifaceted analysis of singing voices respectively included in a plurality of musical audio signals of music including singing voice and a plurality of modified musical audio signals, based on the vocal topic distributions stored in the vocal topic distribution storing processor 8 and the vocal symbol distributions stored in vocal symbol distribution storing processor 7 [step ST7 of FIG. 2]. An arbitrary technique may be used for multifaceted analysis of singing voices to be performed by the multifaceted singing analyzing processor 9. For example, the multifaceted singing analyzing processor 9 may be configured to display similarities between the plurality of musical pieces on a display portion 10. Alternatively, the multifaceted singing analyzing processor 9 may be configured to perform analysis to determine whether or not one of the singing voices included in the musical audio signals of music including singing voice and the modified musical audio signals is similar to another singing voice included in the musical audio signals of music including singing voice and the modified musical audio signals, based on the vocal topic distributions and the vocal symbol distributions.

The musical audio signals may be accompanied by metadata. In this case, the multifaceted singing analyzing processor 9 may display at least a part of the metadata together with analysis results when displaying the analysis results on a display portion. A part of the metadata displayed on the display portion allows the viewer to recognize the information included in the metadata, thereby enhancing the utilization of analysis results. In step ST9 of FIG. 3B, example analysis results displayed on the display portion 10 are illustrated. In this example, the musical audio signals are each accompanied by a singer's name as the metadata. The multifaceted singing analyzing processor 9 displays the singers' names together with analysis results on the display portion 10 using a word-cloud based approach. Thus, the semantics of singing voices and topics can be visualized by displaying the names of predominant singers using a word-cloud based approach with the display sizes of the respective singers' names in proportion to the occupancy or occupying ratios of the respective singers in the vocal topic distributions and the vocal symbol distributions for each of the vocal topic distributions. With such word-could display, the viewer can imagine the timbres of singing voices from the respective singers' names when looking into the analysis results, thereby further enabling the viewer to assume more latent semantics from the analysis results.

In the word-cloud based approach, if the singers' names are displayed at positions in proportion to the similarities, a song including singing voice similar to that of a particular song can readily be retrieved by judging from the display positions of the singers' names. Here, if a male singer's name and a female singer's name are displayed adjacent to each other, cross-gender similar singers can be retrieved. Further, if singing similarities are calculated throughout the topic distributions, an overall evaluation of singing similarities will be available. On the other hand, if singing similarities are calculated in each topic distribution, an evaluation of singing similarities is focused on one particular topic, which facilitates the analysis of "how similar".

EXAMPLE

Now, an example of multifaceted singing analysis to which the present invention is applied will be described below. In this experimental analysis, songs sung by the singers listed in Table 1 were used and musical audio signals of music including singing voice were all converted into monaural 16-kHz signals.

TABLE 1

| ID | Singer's Name | Gender | No. of Songs |
|---|---|---|---|
| M1 | ASIAN KUNG-FU GENERATION | Male | 3 |
| M2 | BUMP OF CHICKEN | Male | 3 |
| M3 | Fukuyama Masaharu | Male | 3 |
| M4 | GLAY | male | 3 |
| M5 | Hikawa Kiyoshi | Male | 3 |
| M6 | Hirai Ken | Male | 3 |
| F1 | aiko | Female | 3 |
| F2 | JUDY AND MARY | Female | 3 |
| F3 | Hitoto Yo | Female | 3 |
| F4 | Tokyo Jihen | Female | 3 |
| F5 | Utada Hikaru | Female | 3 |
| F6 | Yaida Hitomi | Female | 3 |

The songs listed in the above table were used in the experimental analysis. The songs were selected from those including only one vocal, and appearing on a music chart "Oricon" in Japan (http://www.oricon.co.jp/) and ranked in the top twenty on weekly charts during the period of 2000 to 2008. The songs were sung by six male singers and six female singers. Three songs were selected for each singer. For each of the songs, seven versions of musical audio signals were generated by pitch shifting by amounts ranging from −3 to +3 semitones in 1-semitone steps. Thus, the modified musical audio signals were obtained. Further, for each of the songs, seven versions of musical audio signals were generated by tempo shifting by amounts ranging from 0.7 to 1.3 times speeds in 0.1-speed steps. Thus, the modified musical audio signals were obtained. So, pitch-shifted and tempo-shifted 49 (7×7) vocals were generated from one vocal. A total of D=1764 songs (49×3×12) were used as target songs in the experimental analysis. For each of the songs, vocal feature vectors (vocal features) were estimated from top 15% of frame signals with high vocal likelihood during one minute at the beginning of the song. Clustering was performed with the number of clusters V being set to 100 in the k-means algorithm. The number of topics K was set to 100 and the collapsed Gibbs sampler was used to train the latent Dirichlet allocation model. The hyperparameter $\alpha^{(0)}$ was initially set to 1 and the hyperparameter $\beta^{(0)}$ was initially set to 0.1.

Figure 6:
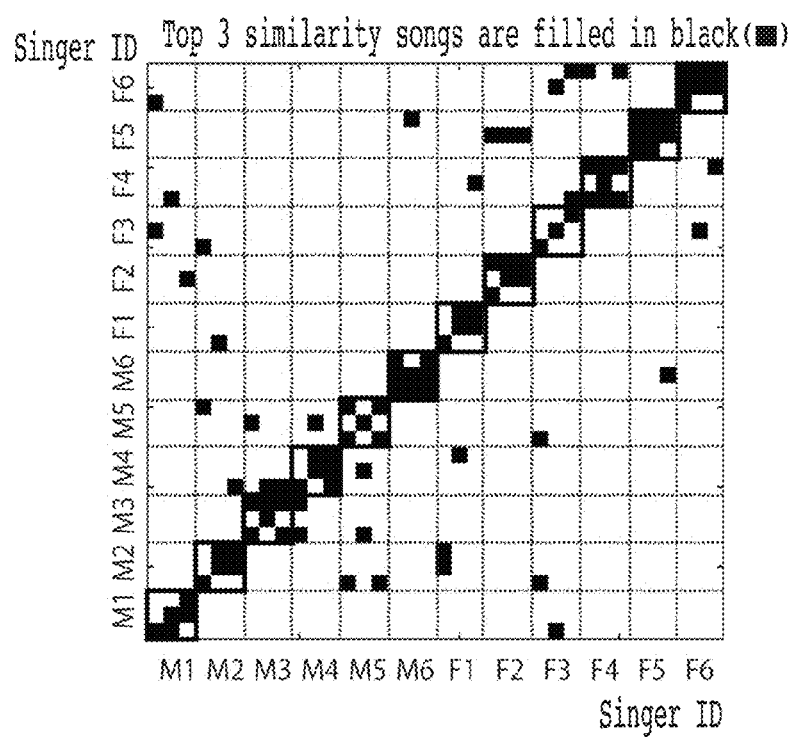
FIG. 6 illustrates a similarity matrix based on the mixing weights of topics obtained from 1000 iterations (hyperparameter a is not updated).

To verify the validity of the LDA topic model trained by using above-mentioned singing data, similarities between songs, which were based on the estimated mixing weights of vocal topics, were confirmed. In FIG. 6, the similarities of the top three similarity songs are filled with black color for each of 36 (=12×3) songs without being subjected to pitch and tempo shifting. FIG. 6 illustrates the results obtained from 1000 iterations and without updating the hyperparameter $\alpha^{(0)}$.

Here, the symmetric Kullback-Leibler distance (KL2) was calculated as shown in expression (7), assuming that the mixing weight of vocal topics in singing voice A is $\Pi_A$ and the mixing weight of vocal topics in singing voice B is $\Pi_B$. Then, the inverse of the Kullback-Leibler distance (KL2) is defined as a similarity between the two singing voices.

⟨Expression 7⟩

$$d_{KL2}(\pi_A \| \pi_B) = \sum_{k=1}^{K} \pi_A(k) \log \frac{\pi_A(k)}{\pi_B(k)} + \sum_{k=1}^{K} \pi_B(k) \log \frac{\pi_B(k)}{\pi_A(k)} \quad (7)$$

Note that the mixing weights, $\Pi_A$ and $\Pi_B$ are normalized as shown in expression (8) and are regarded as probability distributions.

⟨Expression 8⟩

$$\sum_{k=1}^{K} \pi_A(k) = 1, \sum_{k=1}^{K} \pi_B(k) = 1 \quad (8)$$

In addition to the above-mentioned distance criterion for probability distributions, EMD (Earth Mover's Distance) may be used. When using EMD, the criterion can be given by the mixing weights $\Pi_A$ and $\Pi_B$ of vocal topics, and the distance between two vocal symbol distributions for each topic can be calculated in terms of Kullback-Leibler divergence. For details on EMD, refer to the document [Y. Rubner, C. Tomasi, and L. J. Guibas, "A Metric for Distributions with Applications to Images Databases", Proc. of the 1998 IEEE International Conference on Computer Vision, Bombay, India, January 1998, pp. 59-66; ICCV1998Rubner.pdf].

In the similarity matrix of FIG. 6, in general, songs sung by the same singer are filled with black color (for songs with the top three similarity), which indicates that the mixing weights of vocal topics are similar between the songs sung by the same singer. It follows from the foregoing that the latent Dirichlet allocation (LDA) works appropriately. This evaluation results imply that the mixing weights of vocal topics in the singing voices, which are obtained by performing topic-based analysis of vocal feature vectors (vocal features) using the latent Dirichlet allocation, may be applied to singer identification.

[Two Approaches Utilizing Vocal Topic Model]

The example application of the present invention employs a latent Dirichlet allocation model which is trained as mentioned above and is useful for singer identification. The multifaceted singing analysis of the present invention, however, is not limited to the above-mentioned example.

Another example of analysis approach is "Cross-Gender Similar Singing Retrieval" which identifies a singer based on singing voices including pitch-shifted and tempo-shifted singing voices by suppressing the difference in speed. A further example of analysis approach is "Visualization of Vocal Topics" which visualizes the semantics of vocal topics by using a word-cloud based approach, thereby helping the user to find his/her favorite vocal topics. If the user understands the semantics of vocal topics, he/she will be able to retrieve a similar singer by weighting a particular vocal topic in the similarity calculation of expression (7).

[Example of Cross-Gender Similar Singing Retrieval]

Cross-gender similar singing retrieval has been attained by "virtually increasing" the number of target songs by pitch shifting and tempo shifting and then absorbing the difference in singing speed. As with the first example mentioned above except for the increased number of target songs, similarities between mixing weights of vocal topics are calculated. Table 2 shows query songs which are the ones shown in Table 1, Singer IDs of other singers who have the highest similarities except the singers themselves, and the values for pitch shifting and tempo shifting.

TABLE 2

| Query | Singer ID with Highest Similarity except Singer Himself/Herself | | |
|---|---|---|---|
| (±0/x1) | First Song | Second Song | Third Song |
| M1 | F4 (−3/x0.7) | F5 (−3/x0.8) | M3 (−3/x1) |
| M2 | M4 (−1/x0.8) | M3 (+1/x1.1) | M3 (±0/x1.3) |
| M3 | F3 (−3/x1.1) | M4 (+1/x1.2) | M4 (−2/x1) |
| M4 | M1 (±0/x1.1) | M3 (−1/x1) | F2 (+2/x1.2) |
| M5 | M2 (+1/x1.2) | F5 (−2/x0.8) | M1 (+1/x1.1) |
| M6 | F3 (−3/x0.9) | F3 (−3/x1.2) | F5 (−2/x0.7) |
| F1 | F5 (+2/x0.8) | F5 (+1/x0.8) | F3 (+1/x1) |
| F2 | M1 (−1/x0.9) | F6 (+3/x0.8) | F6 (+3/x0.9) |
| F3 | M6 (+3/x1.1) | M6 (+3/x1.2) | M6 (+2/x1) |
| F4 | F6 (−1/x1.1) | M1 (+2/x0.8) | F6 (+1/x1.3) |
| F5 | F6 (−2/x0.8) | M6 (+3/x1.1) | M5 (+1/x1.1) |
| F6 | F2 (−3/x0.9) | F4 (+1/x0.7) | F4 (±0/x0.8) |

In Table 2, the underlines indicate cross-gender singers who are remarkably similar and boldfaces indicate same-gender singers who are remarkably similar. As can be known from Table 2, "Hirai Ken (M6) and Hitoto YO (F3) are similar when the pitch of M6 are shifted up by 2-3 semitones or the pitch of F3 is shifted down by 2-3 semitones" and "Tokyo Jihen (F4) and Yaida Hitomi (F6) are similar when the pitch is shifted up by 0-1 semitone and the tempo is shifted to 0.7-0.8 time speed for F4, or the pitch is shifted up by 0-1 semitone and the tempo is shifted to 1.1-1.3 times speed for F6." The actual listening impressions were consistent with the results shown in the table. It is well known that Hirai Ken and Hitoto Yo are similar when their pitches are shifted by about 3 semitones. With the results from the experimental analysis, the validity of the technique of the present invention could be confirmed. Here, FIGS. 7A and 7B illustrate the mixing weights of vocal topics for the similar song pair, "MoraiNaki" sung by Hitoto Yo and its most similar song "OmoigaKasanaruSonomaeni . . . " sung by Hirai Ken with 3-semitone pitch-shifting and 1.1 times speed. It can be known from the figures that both singers are characterized by topics 28, 32, and 82.

[Example of Visualization of Songs and Topics Using Word-Cloud Based Approach]

The mixing weight $\Pi_{dk}$ of each singing voice is a K-dimensional vector (the number of topics) of D singing voices (the number of singing voices). It means "predominant topic k can be known in each singing voice d". In the present example, based on the above meaning, singer identification and similar singer retrieval were conducted. Only with the mixing weights of vocal topics illustrated in FIGS. 7A and 7B, however, the semantics of the vocal topics will sometimes not be understood. Then, it may inversely be considered "a predominant singing voice d in each vocal topic k may be known from the mixing weights of vocal topics". So, the semantics of the respective topics were visualized in the present example. Here, a technique called "word cloud" which visually depicts words such as tags frequently used in the websites was applied to the present example and predominant singers of each topic were visualized with large sizes. This approach is named herein "singer cloud". The semantics of the topics were visualized using the "singer cloud" approach in FIGS. 8A to 8D. Compared with a mere enumeration of singers' names, the singer cloud approach provides an explanatory singer listing and is useful. As shown in FIGS. 8A to 8D, the singers' names were visualized with different sizes according to the sum of mixing weights of vocal topics for the same song (with no regard to differences in pitch and tempo). In FIG. 8A, the singing voice of Hitoto Yo was predominant in topic 28 with high similarities. Next, as illustrated in FIGS. 8B and 8C, the singing voice of Hitoto YO shared some characteristics with the singing voices of Utada Hikaru, Tokyo Jihen, and Yaida Hitomi in topics 32 and 82 with high similarities. In contrast, in FIG. 8D, it can be presumed that the singing voice of Hitoto Yo shared some different characteristics with those of ASIAN KUNG-FU GENERATION, JUDY and MARY, and aiko in topic 23 which appeared only in the singing voice of Hitoto Yo. Thus, visual impressions of the singer clouds are changed by increasing the number of data sets.

In the above-mentioned experimental analysis, the analysis was performed on "one minute of the song at the beginning". If the analysis is to be performed on "the whole part of the song", the estimation precision will be further improved.

Figure 9:
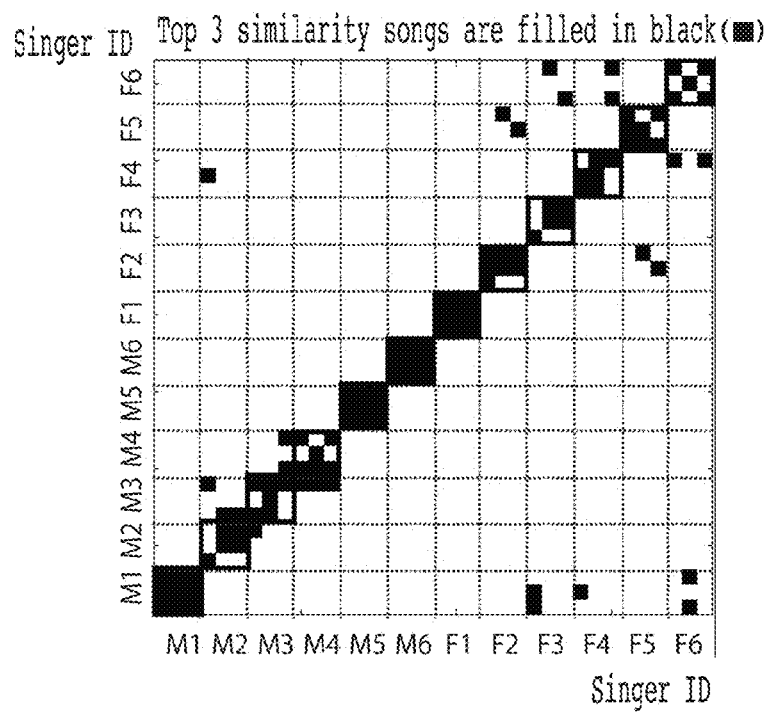
FIG. 9 illustrates a similarity matrix based on the mixing weights of topics obtained from 1000 iterations in the analysis using all of the songs (hyperparameter a is not updated).

FIG. 9 illustrates a similarity matrix when the analysis was performed on the whole part of each song. As with FIG. 6, the top 3 similarity songs are filled with black color, and FIG. 9 illustrates the results obtained from 1000 iterations without updating the hyperparameter $\alpha^{(0)}$. In FIG. 6, songs of the same singer were used as queries, and there were 30 cases where the songs of that singer and other singers were included in the top 3 similarity songs. In FIG. 9, there were 17 cases where the songs of that singer and other singers were included in the top 3 similarity songs. This means that the similarities between the songs sung by the same singer were more highly estimated; namely, similarities between songs could be estimated more precisely.

Figure 10A:
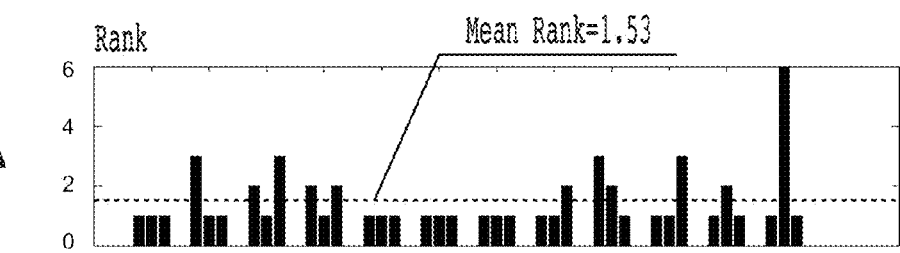
FIGS. 10A and 10B illustrate similarity ranks and the mean rank thereof, and reciprocal ranks and the mean reciprocal rank thereof, based on the similarity matrix of FIG. 9.
Figure 10B:
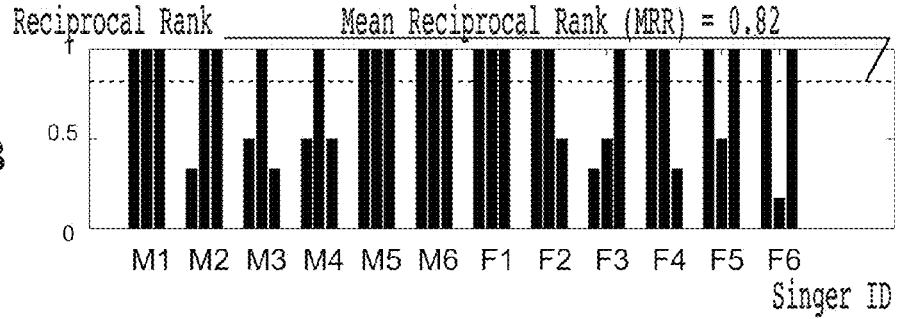

FIGS. 10A and 10B illustrate more quantitatively the results of FIG. 9. Here, a song of a particular singer was used as a query. FIG. 10A illustrates the higher similarity rank out of two songs sung by the same singer as the one who sang the query song, and the mean rank of the higher similarity ranks in connection of all of the queries sung by all of the singes. FIG. 10B illustrates a reciprocal of the higher similarity rank (a reciprocal rank) of FIG. 10A and the mean reciprocal rank (MRR) of the higher similarity ranks in connection of all of the queries sung by all of the singes. The closer to 1 the mean reciprocal is, the higher retrieval performance is.

FIG. 11 illustrates the results of analysis performed on the whole part of each song more quantitatively than in Table 2. In Table 2, a song of a particular singer was used as a query and the singers' names of those songs which were retrieved as being most similar (with the highest similarity) were shown. In FIG. 11, all of D=1764 songs were used as queries, and the total numbers of singers who sang the most similar song to each query were shown.

INDUSTRIAL APPLICABILITY

Among many inventions aimed at modeling and analyzing individual singing voices, latent characteristics available from a plurality of singing voices can be analyzed according to the present invention.

SIGN LISTING

1 Musical audio signal generating processor
2 Frame signal acquiring processor
3 Vocal feature vector estimating processor
4 Analysis-fitted segment estimating processor
5 Vector discretizing processor
6 Topic analyzing processor
7 Vocal symbol distribution storing processor
8 Vocal topic distribution storing processor
9 Multifaceted singing analyzing processor
10 Display portion

The invention claimed is:
1. A system for multifaceted singing analysis comprising:
   a musical audio signal generating processor operable to generate one or more modified musical audio signals, of which music and vocal characteristics are modified, from each of musical audio signals of music including singing voice;
   a frame signal acquiring processor operable to acquire a plurality of frame signals in time series from each of the musical audio signals by applying a predetermined window function to one of the musical audio signal of music including singing voice and the one or more modified musical audio signals;
   a vocal feature vector estimating processor operable to estimate a plurality of vocal feature vectors for each of the frame signals acquired from each of the musical audio signals;
   an analysis-fitted segment estimating processor operable to estimate analysis-fitted segments by determining whether or not each segment in the frame signals is fitted for analysis, based on the vocal feature vectors as estimated by the vocal feature vector estimating processor;
   a vector discretizing processor operable to discretize the plurality of vocal feature vectors in the analysis-fitted segments to convert them into a vocal symbolic time series composed of a plurality of vocal symbols;

a topic analyzing processor operable to analyze, using a topic model, a plurality of the vocal symbolic time series obtained for the respective musical audio signals of music including singing voice and the modified musical audio signals, to generate a vocal topic distribution for each of all the musical audio signals, the vocal topic distribution being composed of a plurality of vocal topics each indicating a relationship of one of the musical audio signals with the other musical audio signals, and to generate a vocal symbol distribution for each of all the vocal topics, the vocal symbol distribution indicating respective occurrence probabilities for the vocal symbols;

a vocal topic distribution storing processor operable to store a plurality of the vocal topic distributions generated by the topic analyzing processor;

a vocal symbol distribution storing processor operable to store a plurality of the vocal symbol distributions generated by the topic analyzing processor; and a multifaceted singing analyzing processor operable to perform multifaceted analysis of singing voices respectively included in the musical audio signals of music including singing voice and the modified musical audio signals, based on the vocal topic distributions stored in the vocal topic distribution storing processor and the vocal symbol distributions stored in vocal symbol distribution storing processor.

2. The system for multifaceted singing analysis according to claim 1, wherein:
the multifaceted singing analyzing processor displays similarities between a plurality of singing voices included in the musical audio signals on a display portion.

3. The system for multifaceted singing analysis according to claim 1, wherein:
the multifaceted singing analyzing processor is operable to perform analysis to determine whether or not one of the singing voices included in the musical audio signals of music including singing voice and the modified musical audio signals is similar to another singing voice included in the musical audio signals of music including singing voice and the modified musical audio signals, based on the vocal topic distributions and the vocal symbol distributions.

4. The system for multifaceted singing analysis according to claim 1, wherein:
the musical audio signals are accompanied by metadata; and
the multifaceted singing analyzing processor displays at least a part of the metadata together with analysis results when displaying the analysis results on a display portion.

5. The system for multifaceted singing analysis according to claim 1, wherein:
the musical audio signal generating processor generates the one or more modified musical audio signals by shifting pitches of the musical audio signals of music including singing voice.

6. The system for multifaceted singing analysis according to claim 1, wherein:
the musical audio signal generating processor generates the one or more modified musical audio signals by shifting tempos of the musical audio signals of music including singing voice.

7. The system for multifaceted singing analysis according to claim 1, wherein:

the analysis-fitted segment estimating processor estimates vocal segments as the analysis-fitted segments.

8. The system for multifaceted singing analysis according to claim 1, wherein:
the vocal feature vector is represented by a linear predictive mel-cepstral coefficient and $\Delta F0$ of the singing voice.

9. The system for multifaceted singing analysis according to claim 1, wherein:
the vector discretizing processor performs discretization by using a clustering algorithm such as a k-means algorithm.

10. The system for multifaceted singing analysis according to claim 2, wherein:
the musical audio signals of music including singing voice are each accompanied by a singer's name as the metadata of the music; and
the multifaceted singing analyzing processor displays the singers' names together with the analysis results on the display portion by using a word-cloud based approach.

11. The system for multifaceted singing analysis according to claim 10, wherein:
retrieval of similarities between the singers is enabled by displaying the singers' names at different positions with different sizes in the word-cloud based approach.

12. A method for multifaceted singing analysis implemented in a computer to cause the computer to execute the steps of:
generating one or more modified musical audio signals, of which music and vocal characteristics are modified, from each of musical audio signals of music including singing voice;

acquiring a plurality of frame signals in time series from the musical audio signals by applying a predetermined window function to one of the musical audio signals of music including singing voice and the one or more modified musical audio signals;

estimating a plurality of vocal feature vectors for each of the frame signals acquired from the musical audio signals;

estimating analysis-fitted segments by determining whether or not each segment in the frame signals is fitted for analysis, based on the vocal feature vectors estimated in the step of estimating a plurality of vocal feature vectors;

discretizing the plurality of vocal feature vectors in the analysis-fitted segments to convert them into a vocal symbolic time series composed of a plurality of vocal symbols;

analyzing topics using a topic model by analyzing a plurality of the vocal symbolic time series obtained for the respective musical audio signals of music including singing voice and the one or more modified musical audio signals, to thereby generate a vocal topic distribution for each of all the musical audio signals whereby the vocal topic distribution is composed of a plurality of vocal topics each indicating a relationship of one of the musical audio signals with the other musical audio signals and to thereby generate a vocal symbol distribution for each of all the vocal topics whereby the vocal symbol distribution indicates respective occurrence probabilities for the vocal symbols;

storing the vocal topic distributions generated by the step of analyzing topics in a vocal topic distribution storing processor;

storing the vocal symbol distributions generated by the step of analyzing topics in a vocal symbol distribution storing processor; and performing multifaceted analysis of singing voices respectively included in the musical audio signals of music including singing voice and the one or more modified musical audio signals, based on the vocal topic distributions stored in the vocal topic distribution storing processor and the vocal symbol distributions stored in vocal symbol distribution storing processor.

13. The method for multifaceted singing analysis according to claim 12, wherein:

in the step of performing multifaceted analysis of singing voices, similarities between a plurality of singing voices included in the musical audio signals are displayed on a display portion.

14. The method for multifaceted singing analysis according to claim 12, wherein:

the step of performing multifaceted analysis of singing voices is configured to perform analysis to determine whether or not singing voices included in the musical audio signals of music including singing voice and the one or more modified musical audio signals is similar to another singing voice included in the musical audio signals of music including singing voice and the one or more modified musical audio signals, based on the vocal topic distributions and the vocal symbol distributions.

15. The method for multifaceted singing analysis according to claim 12, wherein:

the musical audio signals are accompanied by metadata; and at least a part of the metadata is displayed together with analysis results when displaying the analysis results on a display portion, in the step of performing multifaceted analysis of singing voices.

16. The method for multifaceted singing analysis according to claim 12, wherein:

in the step of generating one or more modified musical audio signals, the one or more modified musical audio signals are generated by shifting pitches of the musical audio signals of music including singing voice.

17. The method for multifaceted singing analysis according to claim 12, wherein:

in the step of generating one or more modified musical audio signals, the one or more modified musical audio signals are generated by shifting tempos of the musical audio signals of music including singing voice.

18. The method for multifaceted singing analysis according to claim 12, wherein:

in the step of estimating analysis-fitted segments, vocal segments are estimated as the analysis-fitted segments.

19. The method for multifaceted singing analysis according to claim 12, wherein:

the vocal feature vector is represented by a linear predictive mel-cepstral coefficient and $\Delta F0$ of the singing voice.

20. The method for multifaceted singing analysis according to claim 12, wherein:

in the step of discretizing vectors, discretization is performed by using a clustering algorithm such as a k-means algorithm.

21. The method for multifaceted singing analysis according to claim 15, wherein:

the musical audio signals of music including singing voice are each accompanied by a singer's name as the metadata of the music; and in the step of performing multifaceted analysis of singing voices, the singers' names are displayed together with the analysis results on the display portion by using a word-cloud based approach.

22. The method for multifaceted singing analysis according to claim 21, wherein:

retrieval of similarities between the singers is enabled by displaying the singers' names at different positions with different sizes in the word-cloud based approach.

* * * * *